US012712100B2

(12) United States Patent
Brück et al.

(10) Patent No.: US 12,712,100 B2
(45) Date of Patent: Aug. 18, 2026

(54) ELECTRICAL FEEDTHROUGH WITH TOUCH PROTECTION

(71) Applicant: Vitesco Technologies GmbH, Regensburg (DE)

(72) Inventors: Rolf Brück, Bergisch Gladbach (DE); Jan Hodgson, Troisdorf (DE); Peter Hirth, Rösrath (DE)

(73) Assignee: Vitesco Technologies GmbH, Regensburg (DE)

( * ) Notice: Subject to any disclaimer, the term of this patent is extended or adjusted under 35 U.S.C. 154(b) by 195 days.

(21) Appl. No.: 18/715,323

(22) PCT Filed: Dec. 1, 2022

(86) PCT No.: PCT/EP2022/083999
§ 371 (c)(1),
(2) Date: May 31, 2024

(87) PCT Pub. No.: WO2023/099645
PCT Pub. Date: Jun. 8, 2023

(65) Prior Publication Data

US 2025/0029753 A1 Jan. 23, 2025

(30) Foreign Application Priority Data

Dec. 2, 2021 (DE) ..................... 10 2021 213 735.0

(51) Int. Cl.
*H01B 17/26* (2006.01)
*F01N 3/20* (2006.01)

(52) U.S. Cl.
CPC ........... *H01B 17/26* (2013.01); *F01N 3/2013* (2013.01)

(58) Field of Classification Search
CPC ...... H01B 17/26; H01B 17/265; H01B 17/00; H01B 17/005; F01N 3/2013
(Continued)

(56) References Cited

U.S. PATENT DOCUMENTS 4,096,352 A * 6/1978 von Zweck ............ H01B 17/30
174/153 R
4,508,797 A * 4/1985 Knoedler ............ H01M 50/184
429/184

(Continued)

FOREIGN PATENT DOCUMENTS

DE 19533088 3/1997
DE 19627840 1/1998

(Continued)

OTHER PUBLICATIONS

Office Action of corresponding European Patent Application No. EP 22829717.2, dated May 13, 2025.

(Continued)

*Primary Examiner* — Angel R Estrada
(74) *Attorney, Agent, or Firm* — COZEN O'CONNOR

(57) ABSTRACT

An electrical feedthrough for electrically contacting a heat conductor in an exhaust gas guiding device for heating an exhaust gas flow. The heat conductor is located in a housing and at least one electrical conductor designed as a bolt is guided through an opening in the housing and is electrically conductively connected to the heat conductor. The electrical conductor is electrically insulated with respect to the housing and is permanently connected to the housing by a socket. The portion of the electrical conductor outside the housing is enclosed by a touch protection.

12 Claims, 4 Drawing Sheets

(58) Field of Classification Search
USPC ........ 174/153 R, 650, 66, 67, 138 R, 137 R, 174/138 F
See application file for complete search history.

(56) References Cited

U.S. PATENT DOCUMENTS

| | | | | |
|---|---|---|---|---|
| 5,525,759 | A * | 6/1996 | Salzman | H01B 17/26 174/50.56 |
| 5,935,473 | A | 8/1999 | Hashimoto et al. | |
| 6,176,081 | B1 | 1/2001 | Shimasaki et al. | |
| 8,761,586 | B2 * | 6/2014 | Bruck | F01N 3/2026 219/202 |
| 8,791,375 | B2 * | 7/2014 | Fisher | H02G 3/18 174/653 |
| 8,963,015 | B2 * | 2/2015 | Wittkop | H01G 4/35 174/75 C |
| 12,312,986 | B2 * | 5/2025 | Neumann | H05B 3/08 |
| 12,456,562 | B2 * | 10/2025 | Bellora | H01B 11/00 |
| 2018/0087429 | A1 | 3/2018 | Nakamura et al. | |
| 2020/0131965 | A1 | 4/2020 | Stiglmair et al. | |

FOREIGN PATENT DOCUMENTS

| | | |
|---|---|---|
| DE | 102017216470 | 3/2019 |
| DE | 102022100036 | 7/2022 |
| EP | 3299599 | 3/2018 |
| EP | 3685025 | 7/2020 |
| FR | 3095474 | 10/2020 |
| JP | H11512166 | 10/1999 |
| JP | 2011171139 | 9/2011 |
| JP | 2018048615 | 3/2018 |

OTHER PUBLICATIONS

Notification to Grant of corresponding Japanese Patent Application No. 2024-532868, dated Oct. 27, 2025.
Office Action of corresponding Japanese Patent Application No. 2024-532868 dated Jun. 16, 2025.
Office Action of corresponding German Patent Application No. DE 10 2021 213 735.0, dated Aug. 12, 2022.

* cited by examiner

ELECTRICAL FEEDTHROUGH WITH TOUCH PROTECTION

CROSS REFERENCE TO RELATED APPLICATIONS

This is a U.S. national stage of Application No. PCT/EP2022/083999 filed Dec. 1, 2022. Priority is claimed on German Application No. DE 10 2021 213 735.0 filed Dec. 2, 2021, the content of which is incorporated herein by reference.

BACKGROUND OF THE INVENTION

1. Field of the Invention

The disclosure relates to an electrical feedthrough for electrically contacting a heat conductor in an exhaust gas guiding device for heating an exhaust gas flow, wherein the heat conductor is located in a housing and at least one electrical conductor designed as a bolt is guided through an opening in the housing and is electrically conductively connected to the heat conductor, wherein the electrical conductor is electrically insulated with respect to the housing and is permanently connected to the housing by of a socket.

2. Description of the Related Art

Heating elements are used for faster heating of exhaust gas aftertreatment devices, especially in exhaust systems of internal combustion engines. These heat both the flowing exhaust gas and the neighboring structures, such as the honeycombs that form the catalytic converters or evaporation elements. Preferably, heating takes place using ohmic resistance, whereby an electric current is converted into heat in a conductive structure. Heating elements of this kind are known in a wide variety of forms in the prior art. These include, for example, metallic honeycomb bodies which are arranged inside a housing and through which an exhaust gas can flow. The honeycomb bodies are electrically conductively connected to a voltage source by an electrical feedthrough that runs through the housing.

One challenge with such heating elements is the permanent electrical connection of the honeycomb body, wherein in particular the mechanical loads occurring in a motor vehicle, the thermal loads and the corrosive influences must be taken into account. In addition, it must be ensured that comprehensive electrical insulation takes place at the intended points to ensure a controlled current flow from the voltage source to the honeycomb body. Short circuits due to defective electrical insulation can lead to undesired current conduction through the honeycomb body and thus possibly contribute to the destruction of the honeycomb body. Unintentional short circuits can also pose a danger to people. Processes that can lead to undesirable short circuits are in particular assembly processes, repair work on the vehicle or accidents.

In particular, the electrical contacting outside the housing of the heating element is exposed to particularly strong external influences due to its position on the underbody of a motor vehicle or in the direct vicinity of the engine. Typically, such electrical contacts are exposed to dust, dirt, water or corrosive media, such as salt water, during operation, which can permanently damage the electrical contacts.

A particular disadvantage of prior art devices is that the external influences described above can permanently destroy the electrical insulation, or a sufficiently conductive medium, such as salt water, can cause electrical conduction between two portions that are basically electrically insulated from each other. In addition to the provision of sufficiently mechanically robust materials, robustness against electrochemical effects in particular must also be ensured.

SUMMARY OF THE INVENTION

It is an object of the present invention to create an electrical feedthrough for contacting a heatable honeycomb body, which has both touch protection and protection against fluids, thereby avoiding unwanted short circuits and leakage currents as well as destruction of the electrical insulation.

One aspect of the invention relates to an electrical feedthrough for electrically contacting a heat conductor in an exhaust gas guiding device for heating an exhaust gas flow, wherein the heat conductor is located in a housing and at least one electrical conductor designed as a bolt is guided through an opening in the housing and is electrically conductively connected to the heat conductor, wherein the electrical conductor is electrically insulated with respect to the housing and is permanently connected to the housing by a socket, wherein the portion of the electrical conductor outside the housing is enclosed by a touch protection.

The electrical feedthrough is used for electrical contacting, for example, of a heating catalytic converter in a motor vehicle exhaust system. The electrical conductor inserted into the exhaust system, which is spatially delimited by a housing, is electrically insulated with respect to the housing by suitable insulation. For example, a ceramic insulating sleeve is used to hold the electrical conductor. The ceramic insulating sleeve is itself housed in turn in a metal sleeve, which is permanently connected to the housing.

The heating catalytic converter is preferably formed by a metallic honeycomb body through which an electric current can flow along a defined path. For this purpose, the metallic honeycomb body is brought into conductive contact with the electrical conductor.

A touch protection arranged over the outer region of the electrical feedthrough can reduce or completely prevent direct mechanical damage and also reduce exposure to a potentially electrically conductive liquid. The design of the touch protection is particularly important here, especially the choice of material. By reducing the exposure of the electrical insulation to corrosive media, it is possible to prevent the ceramic forming the insulator from being damaged, for example by avoiding leaching.

In particular, the touch protection counteracts unintentional contact with the electrical conductor, wherein in particular contact with the hand or an electrically conductive foreign object is avoided. The touch protection serves here in particular to shield the electrical conductor, the housing location into which the electrical conductor is inserted and the connection of the electrical conductor to the electrical cable supplying the current. Another aspect of the touch protection is to keep fluids of all kinds, in particular electrically conductive liquids, away from the electrical conductor or, in particular, from the insulator, which electrically insulates the electrical conductor from the metal sleeve and the housing. The term “touch protection” is therefore not limited exclusively to physical touch protection to prevent a short circuit, but also describes the prevention of contact between the electrical conductor and a fluid, in particular a corrosive fluid and/or an electrically conductive fluid.

It is particularly advantageous if the housing has a collar that protrudes from the housing and surrounds the opening in the housing. A collar can be formed by a metal ring, for example, which is attached to the housing. The collar is preferably formed completely circumferentially in the circumferential direction of the electrical conductor. Preferably, the collar extends from the outer wall of the housing from this path and thus forms a substantially cylindrical interior in which the portion of the electrical conductor located outside the housing is accommodated.

In an advantageous aspect, the collar protrudes from the housing to such an extent that the electrical conductor, in its region outside the housing, is completely enclosed by the collar. The end of the collar facing away from the housing is open and preferably forms an annular gap to the electrical conductor. This annular gap is preferably designed in such a way that the penetration of foreign bodies is avoided, and also narrow enough that it is not possible to reach into the region between the electrical conductor and the collar.

In a further aspect, the collar is designed in such a way that the electrical conductor protrudes beyond the collar, wherein the protruding region of the electrical conductor is preferably electrically insulated.

It is also advantageous if the collar tapers conically along its extension away from the housing. This is advantageous in order to form a sufficiently narrow annular gap, particularly at the open end of the collar.

In an alternative aspect, the collar can also be cylindrical or, for example, stepped. The collar preferably has heat-dissipating elements, such as ribs, in order to be able to dissipate the heat generated at the housing and in particular at the contact region of the electrical conductor with the metallic honeycomb body in the housing. The preferred material for the collar is a high-temperature plastic, ceramic or aluminum.

The collar can be permanently welded to the housing or connected with clips or via a screw connection for the purpose of replacement or maintenance. Furthermore, the collar can have openings that are designed to prevent the ingress of foreign bodies and at the same time allow fluids to drain away.

A preferred exemplary aspect is characterized in that the electrical conductor is connected to a current-carrying line outside the housing by a connecting element, wherein the collar projects at least partially beyond the connecting element.

The electrical conductor, designed as a metallic bolt, is connected to an electrical supply line by a connecting element, for example a terminal that can be screwed on. The connecting element can completely accommodate the outward-facing end region of the electrical conductor so that the electrical conductor is completely enclosed and contact with the electrical conductor from the outside is no longer possible. The collar is then preferably pulled so far that the connecting element protrudes into the collar. This means that the electrical conductor is completely protected against external contact.

It is also preferable if the touch protection is formed by a lid-like cover element that is slipped over the outer region of the electrical conductor. As an alternative to the collar or also in addition to the collar, the touch protection can also be formed by a lid-like cover element, which can be slipped over the region of the electrical conductor located outside the housing to prevent unintentional contact with the electrical conductor. The lid-like element is preferably designed here in such a way that there is a minimum distance between the electrical conductor and the lid-like element at all points. Alternatively, electrically insulating intermediate layers can be provided at narrow points or contact points to ensure that the touch protection is potential-free.

If the cover element described as a touch protection is fundamentally intended to prevent fluids from entering the insulator, it can also be connected to the electrical conductor electrically conductively. In this case, the cover element must be stored in such a way that no electrical short circuit can occur with the housing.

Furthermore, it is advantageous if the lid-like element protrudes into the collar projecting from the housing or surrounds it. The lid-like element can have a smaller outer diameter than the inner diameter of the collar, in which case the lid-like element can engage in the collar. An inverse ratio of the diameters is also possible, wherein the lid-like element then surrounds the collar. Both the lid-like element and the collar can also have shoulder-like passages that form a region running substantially parallel to the housing surface. This allows a labyrinth-like structure to be formed between the collar and the lid-like element, which can in particular prevent foreign bodies from intervening and infiltrating.

Furthermore, it is advantageous if the housing is assigned to a first electrical potential, wherein the electrical conductor is assigned to a second electrical potential, wherein the touch protection means is not assigned to any electrical potential. This is advantageous or absolutely necessary to prevent a short circuit from occurring when the touch protection is touched and posing a risk to the environment.

It is also useful if the touch protection is made of a metallic grid, a perforated plate or an expanded metal. The advantage of these materials is that they are easy to shape, provide good protection against foreign bodies and still allow fluids to flow away and not be trapped on the electrical conductor or, for example, the electrical insulation.

In addition, it is advantageous if the touch protection is electrically insulated with respect to the electrical conductor and/or with respect to the current-carrying line and/or with respect to the housing. By way of example, rubber elements or silicone seals can be used for this purpose. Electrical insulation is particularly advantageous in order to avoid short circuits.

It is also useful if the opening region of the touch protection facing the housing is closed. This helps in particular to prevent the penetration of foreign bodies or unintentional intervention. In a preferred aspect, the touch protection or the insulator arranged at the opening region has at least small openings that allow fluids to drain away at the base region of the touch protection near the housing.

Advantageous developments of the present invention are described in the dependent claims and in the following description of the figures.

BRIEF DESCRIPTION OF THE DRAWINGS

The invention will be explained in more detail below by means of exemplary embodiments with reference to the drawings, in which.

DETAILED DESCRIPTION OF THE PRESENTLY PREFERRED EMBODIMENTS

Figure 1:
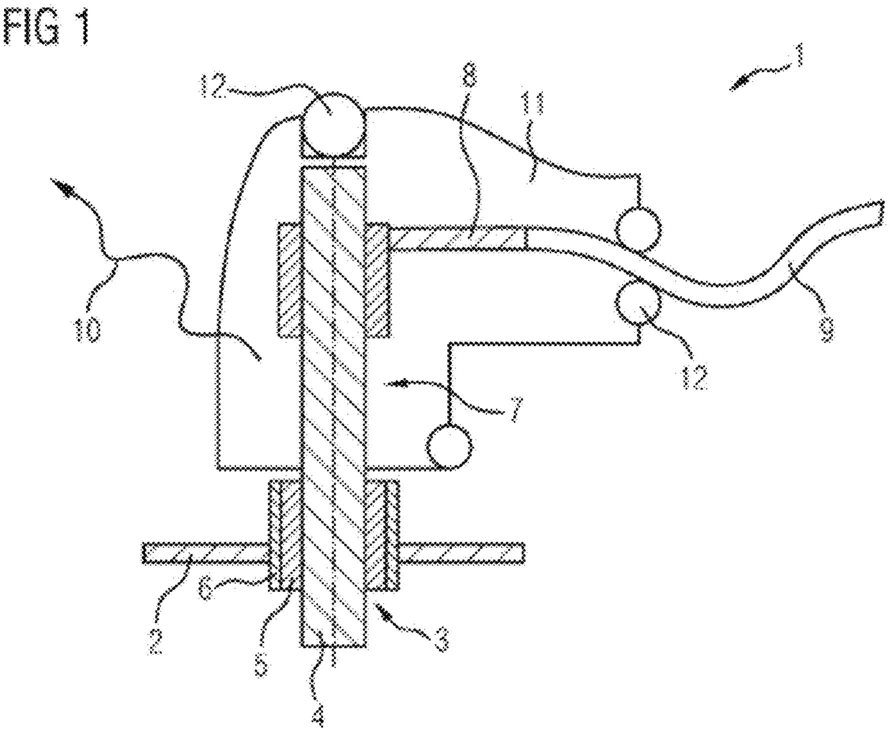
FIG. 1 is a sectional view through an electrical feedthrough, wherein the external region of the electrical conductor is surrounded by a touch protection.

FIG. 1 shows an electrical feedthrough 1. The housing 2 has an opening 3 through which an electrical conductor 4, which is formed by a metallic bolt, is guided. The conductor 4 is enclosed by a sleeve-shaped insulator 5, which is held in a metal sleeve 6. The metal sleeve 6 is in turn welded to the housing 2.

The electrical conductor 4 protrudes beyond the metal sleeve 6 and the insulator 5 in its axial direction of extent and thus forms a region 7 outside the housing 2. At this region 7, the electrical conductor 4 is connected to an electrical supply line 9 via a connecting element 8, whereby the electrical conductor 4 is assigned to a first voltage potential. The housing 2 is regularly assigned to a second voltage potential.

The corrugated arrow 10 in FIG. 1 shows the heat transfer from the electrical conductor 4, which dissipates the heat from inside the housing 2, to the surrounding environment. In particular, heat dissipation must not be completely prevented or significantly impeded by a touch protection 11, as shown in FIG. 1.

The touch protection 11 encloses the outer region 7 of the electrical conductor 4, the connecting element 8 and part of the electrical supply line 9. The touch protection 11 preferably sits on the insulator 5 so that it has no electrically conductive connection with the electrical conductor 4. At the points of contact with the insulator 5 or the electrical conductor 4, additional insulating elements 12 can be provided to prevent current from entering the touch protection 11. Insulating elements 12 can also be provided in relation to the electrical supply line 9 in order to electrically decouple the touch protection 11.

Figure 2:
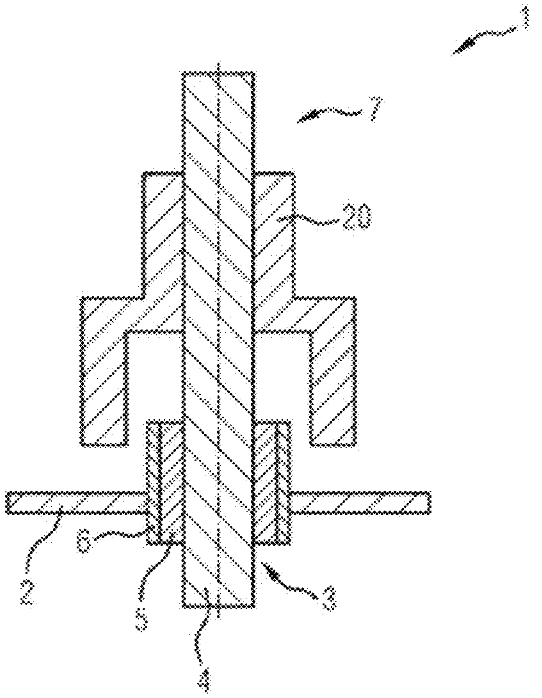
FIG. 2 is a sectional view through an electrical feedthrough, wherein a lid-like cover is pushed over the electrical conductor.

FIG. 2 shows a section through an electrical feedthrough 1, as has already been shown in FIG. 1 The reference signs for identical elements in this figure and in the following figures correspond to those in FIG. 1.

In FIG. 2, a lid-like cover element is provided as touch protection 20 and is slipped over the electrical conductor 4 and rests on the housing 2 or the insulator 5 or the metal sleeve 6. Preferably, this touch protection 20 is designed in such a way that it is not conductive and therefore has an electrically insulating effect. This means that no further insulation measures need to be provided.

In particular, the touch protection shown in FIG. 2 also provides protection against corrosive media entering the insulator 5, which in particular prevents electrocorrosion and thus gradual destruction of the insulator 5. This also prevents the insulator 5, which is regularly formed from an oxide ceramic, from being washed out.

The touch protection 20 as per FIG. 2 can be combined particularly preferably with a touch protection 11 as per FIG. 1, whereby protection against unintentional contact of the electrical conductor 4 and all current-carrying elements is achieved to the same extent as protection against the entry of fluids and corrosive media to the insulator 5.

Figure 3:
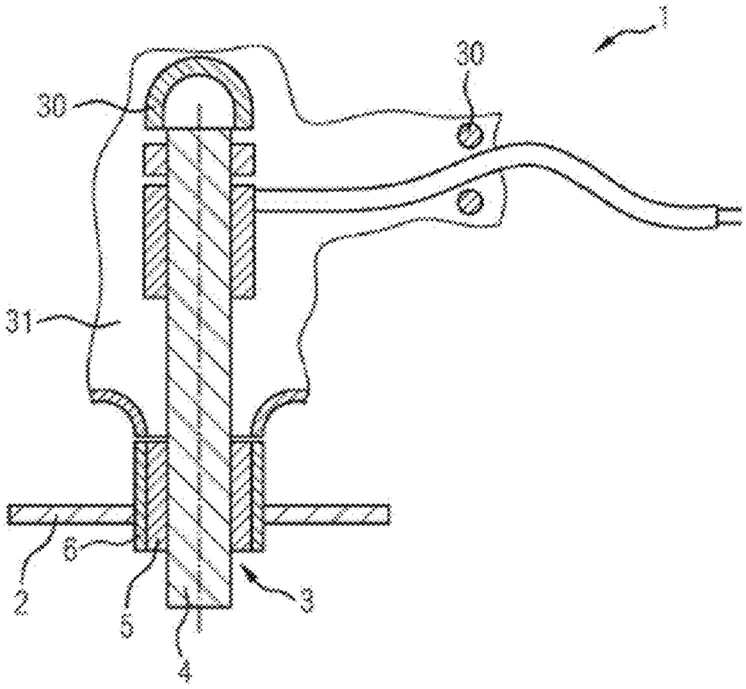
FIG. 3 is a sectional view with a touch protection according to FIG. 1, wherein additional insulating are provided between the electrical conductor and the touch protection.

FIG. 3 also shows a section through the electrical feedthrough 1 as per FIGS. 1 and 2.

The electrical conductor 4 has an insulator 30 at its axial end, which distances it from the touch protection 31. Furthermore, insulator 32 is provided, which distance the touch protection 31 from the metal sleeve 6, and insulating 33 are provided, which create insulation from the electrical supply line 9. The insulating 32 close the opening region of the touch protection 31 facing the housing 2.

The touch protection 31 is designed in such a way that it physically prevents unwanted contact with the electrical conductor 4 by being made of a sufficiently rigid material that can counteract an external force, so that no deformation can occur until the touch protection 31 comes into contact with the electrical conductor 4. The touch protection 31 can preferably be made from an expanded metal, a perforated sheet or a mesh-like metal structure. Alternatively, a non-electrically conductive material can also be considered, which would simplify electrical insulation.

The touch protection 31 and/or the insulating 32 preferably have openings that allow a fluid to flow out, but at the same time are so finely designed that the penetration of foreign bodies is effectively prevented.

Figure 4:
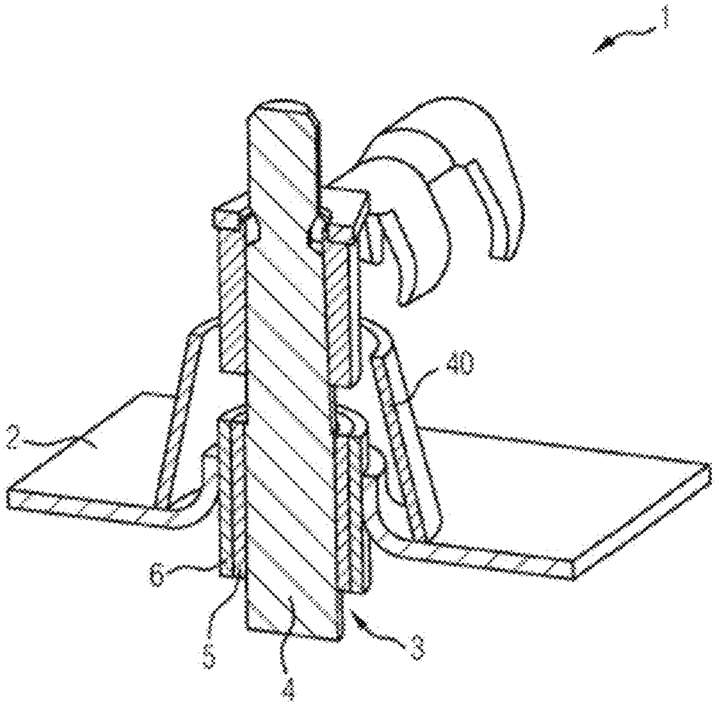
FIG. 4 is a perspective view of an electrical feedthrough with a collar projecting from the housing.

FIG. 4 shows a perspective sectional view through an electrical feedthrough 1 from the previous figures. In addition to the elements described above-housing 2, electrical conductor 4, insulator 5, metal sleeve 6, connecting element 8-FIG. 4 shows a collar 40 that protrudes from the housing 2. In FIG. 4, the collar 40 is tapered and thus increasingly narrows from the housing 2 in the direction of the axial end region of the electrical conductor 4.

Preferably, a circumferential annular gap of at least 1.5 mm in width remains between the electrical conductor 4 or the connecting element 8 and the collar 40 in order to avoid electrical contact, but at the same time to prevent the ingress of foreign bodies.

The collar 40 can also have a cylindrical shape or can be stepped, for example. Appropriately dimensioned openings can be provided to allow fluids to drain away. Preferably, the collar 40 is made of a metallic material that matches the material of the housing 2, for example. High-temperature-resistant plastics or ceramics are also possible.

The height of the collar 40 can be varied and can, for example, also enclose other parts of the connecting element 8. Additional electrically insulating elements can also be provided.

Particularly preferably, a collar 40 can be combined with one of the touch protections 11, 20, 31. The touch protection can engage in the collar 40 or surround it and thus provide effective protection against unintentional contact.

Figure 5:
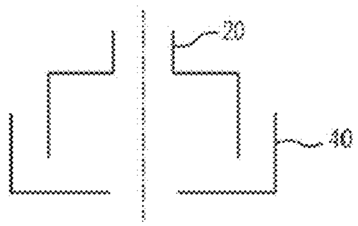
FIG. 5 is a schematic view, wherein a lid-like cover is shown that engages in a collar and thus creates a labyrinthine structure.

FIG. 5 shows a sectional view through a lid-like touch protection, such as that shown in FIG. 2 with the reference sign 20, into a collar 40. Insulation can be provided between the two elements 20, 40.

Figure 6:
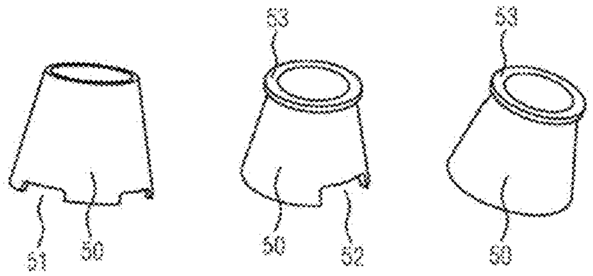
FIG. 6 is three different embodiments of a collar that can project from the housing.

FIG. 6 shows three perspective views of a collar 50, which can project from a housing, not shown, in FIG. 6 and can comprise at least part of the electrical conductor.

The left part of the figure shows a conically tapering collar 50, which has a flat upper edge and drain slots 51 in the base region 4, which are preferably arranged offset by 90 degrees to each other in the circumferential direction. In an application in a motor vehicle, the drain slots are approximately 2 mm high in the shown configuration of the collar 50.

The middle variant shows a collar 50. This has two drain slots 52 spaced at 180 degrees to each other in the circumferential direction, which have a height of 4 mm. At the upper end, the collar 50 has a circumferential drip edge 53, which is designed in particular to prevent the penetration of fluids into the gap formed between the collar 50 and the electrical feedthrough, not shown.

The variant on the right shows the collar 50 without drain slots and with the drip edge 53 already shown in the center. The different features of the collar 50 in FIG. 6 can be combined as desired.

Figure 7:
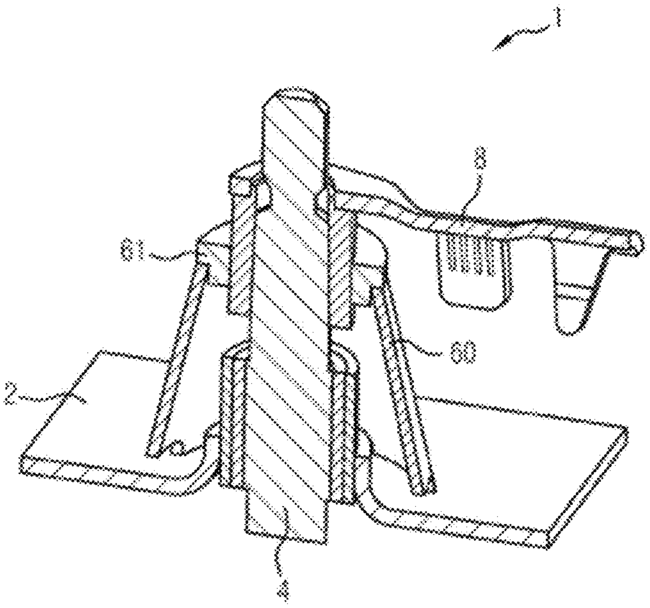
FIG. 7 is a perspective sectional view through an electrical feedthrough, wherein the collar is guided from the housing to the centering sleeve of the connecting element used for electrical contacting.

FIG. 7 shows a perspective view of an electrical feedthrough 1, as already shown in FIG. 4, wherein the collar 60 is now clearly guided over the lower end of the connecting element 8.

The centering sleeve 61 is designed as a ring element with an L-shaped cross-section and is used to center the electrical conductor 4 within the collar 60. This centering sleeve 61 is removed after assembly, creating a circumferential air gap between the collar 60 and the connecting element 8.

Factors for optimizing the fluid entry into the collar 60 are, in particular, the width of the circumferential air gap and, on the other hand, the length of the axial overlap between the collar 60 and the connecting element 8.

Figure 8:
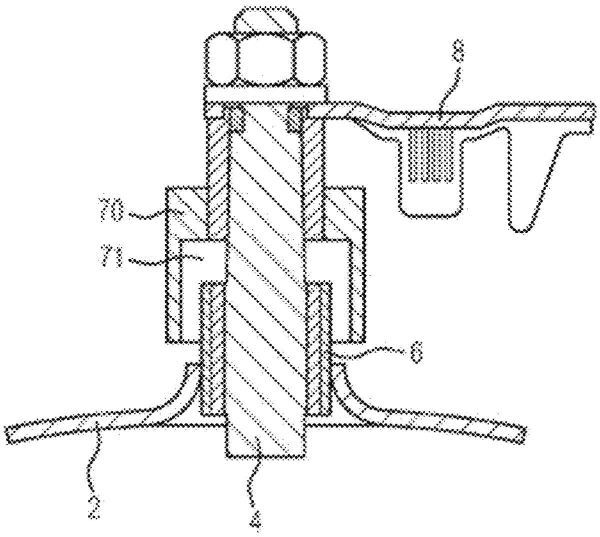
FIG. 8 is a sectional view through an electrical feedthrough, wherein a cover element is slipped over the electrical conductor, thus forming an air gap between the cover element and the metal sleeve.

FIG. 8 shows a sectional view through an electrical feedthrough 1, wherein a lid-like cover 70 is slipped over the electrical conductor 4, which can be part of the connecting element 8, for example.

There is an air gap 71 between the cover 70 and the metal sleeve 6, which has a width in the radial direction of the metal sleeve 6. Furthermore, there is an overlap in the axial direction between the metal sleeve 6 and the cover 70. The width of the air gap 71 and the length of the overlap can be adapted by adjusting the cover 70. It has been found that an air gap of 2 mm width or less is particularly advantageous in order to prevent the penetration of fluids and thus the loading of the insulator 5.

The length of the overlap is preferably at least 5 mm, which has also proven to be particularly advantageous in order to avoid or significantly reduce fluid ingress.

The different features of the individual exemplary embodiments can also be combined with one another in the manner described above or in a similar manner.

The exemplary embodiments of FIGS. 1 to 8 in particular have no restrictive nature and serve to clarify the inventive concept.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An electrical feedthrough configured to electrically contact a heat conductor in an exhaust gas guiding device that heats an exhaust gas flow, wherein the heat conductor is located in a housing comprising:

at least one electrical conductor designed as a bolt and configured to be guided through an opening in the housing and is electrically conductively connected to the heat conductor, wherein the at least one electrical conductor is electrically insulated with respect to the housing and is permanently connected to the housing by a socket; and a touch protection that encloses a portion of the at least one electrical conductor arranged outside the housing, wherein the housing has a collar that surrounds the opening in the housing and tapers conically, narrowing along its extension as the collar protrudes from the housing.

2. The electrical feedthrough as claimed in claim 1, wherein the at least one electrical conductor is connected to a current-carrying line outside the housing by a connecting element, wherein the collar projects at least partially beyond the connecting element.

3. The electrical feedthrough as claimed in claim 1, wherein the touch protection is formed by a lid-like cover element that is slipped over a portion configures as an outer region of the at least one electrical conductor.

4. The electrical feedthrough as claimed in claim 3, wherein the lid-like cover element protrudes into the collar projecting from the housing or surrounds it.

5. The electrical feedthrough as claimed in claim 1, wherein the housing is assigned to a first electrical potential, wherein the at least one electrical conductor is assigned to a second electrical potential, wherein the touch protection is not assigned to any electrical potential.

6. The electrical feedthrough as claimed in claim 1, wherein the touch protection is produced from a metallic grid, a perforated plate or an expanded metal.

7. The electrical feedthrough as claimed in claim 1, wherein the touch protection is electrically insulated with respect to the at least one electrical conductor and/or with respect to a current-carrying line and/or with respect to the housing.

8. The electrical feedthrough as claimed in claim 1, wherein an opening region of the touch protection facing the housing is closed.

9. The electrical feedthrough as claimed in claim 3, wherein a labyrinth-like structure is formed between the collar and the lid-like element.

10. The electrical feedthrough as claimed in claim 1, wherein the collar has at least one drainage slot where it meets the housing.

11. The electrical feedthrough as claimed in claim 1, wherein the collar has a drip edge at its narrow distal end opposite the housing.

12. The electrical feedthrough as claimed in claim 2, wherein a circumferential annular gap of at least 1.5 mm in width remains between the electrical conductor or the connecting element and the collar.

* * * * *